US010393063B2

(12) United States Patent
Singh

(10) Patent No.: US 10,393,063 B2
(45) Date of Patent: Aug. 27, 2019

(54) INTERNAL COMBUSTION ENGINE PISTON WITH CHAMBER

(71) Applicant: Somender Singh, Mysore (IN)

(72) Inventor: Somender Singh, Mysore (IN)

( * ) Notice: Subject to any disclaimer, the term of this patent is extended or adjusted under 35 U.S.C. 154(b) by 45 days.

(21) Appl. No.: 15/713,792

(22) Filed: Sep. 25, 2017

(65) Prior Publication Data

US 2019/0093598 A1 Mar. 28, 2019

(51) Int. Cl.
*F02B 23/06* (2006.01)
*F02F 3/24* (2006.01)
*F02F 3/26* (2006.01)

(52) U.S. Cl.
CPC ................ *F02F 3/24* (2013.01); *F02B 23/06* (2013.01); *F02B 23/0627* (2013.01); *F02F 3/26* (2013.01)

(58) Field of Classification Search
CPC ..................................... F02F 3/24; F02F 3/26
USPC ...................................................... 123/193.6
See application file for complete search history.

(56) References Cited

U.S. PATENT DOCUMENTS 1,745,884 A * 2/1930 Barnaby .................. F02B 3/00 123/262
2,231,392 A * 2/1941 McCarthy ................ F02B 3/00 123/301
4,166,436 A * 9/1979 Yamakawa ............ F02B 23/08 123/193.6
4,572,123 A * 2/1986 Evans .................... F02B 19/14 123/193.6
5,103,784 A 4/1992 Evans
6,237,579 B1 5/2001 Singh
6,729,290 B1 * 5/2004 Rorke ...................... F01B 3/02 123/193.6
7,004,140 B2 * 2/2006 Kim ................... F02B 23/0627 123/193.6
7,810,479 B2 10/2010 Naquin
8,528,514 B1 9/2013 Erlandson
9,091,199 B2 * 7/2015 Straub .................. F02B 17/005
9,279,361 B2 * 3/2016 Rothbauer ................ F02F 3/26
9,869,270 B1 * 1/2018 Anders ............... F02B 23/0687
2018/0038269 A1 * 2/2018 Willi .................. F02B 19/1004

* cited by examiner

*Primary Examiner* — Marguerite J McMahon
(74) *Attorney, Agent, or Firm* — Joanne M. Martin

(57) ABSTRACT

A piston and combustion chamber including piston crown grooves extending from the combustion bowl, promoting swirl and mix within the compressed atmospheric air/gases made up of 78% nitrogen along with 20% oxygen locked in the bowl into an ideal mix with the introduced fuel forming into an ideal charge trapped in the bowl of the piston crown improve thermal efficiencies by overcoming erratic, incomplete and improper combustion resulting in lower emissions that can prevent environmental damages due to pollution from UHC, CO, $NO_x$, soot with the least carbon dioxide formations when using carbon rich fuels such as diesel engine operations under full load.

20 Claims, 2 Drawing Sheets

INTERNAL COMBUSTION ENGINE PISTON WITH CHAMBER

FIELD OF THE INVENTION

The present invention relates to internal combustion engines, in particular, to internal combustion engine pistons and combustion chambers.

BACKGROUND OF INVENTION

Turbulence and swirl are both very important factors to achieve proper mixture formations in a compressing charge to extract maximum thermal energy out of optimum thermal expansions from laminar combustion in I.C. Engines. Induced Turbulence with the help of swirl ports with various twists and hurdles only lasts till the inlet valve shuts. Once compression starts to buildup in a diminishing cylinder, the induced swirl loses momentum nearing TDC due to density increases determined by the compression ratio leading to stagnation. Any form of turbulence at this stage is generated out of squishing the mixture in the desired directions by mirroring the outer rim of the piston crown with the cylinder head forming the combustion chamber. Turbo and Super Chargers achieve force filling of cylinders to the optimum in shorter time durations. However, once the cylinder starts to diminish due to piston movements a proportionate increase in heat occurs within the trapped charge due to rapid increases in density further dropping the induced turbulence resulting in harsh unpredictable combustion in clusters of oxygen/hydrocarbon rich pockets to produce rapid pressure increases in the form of thermal expansions in the hot gases during the combustion process in all types of air breathing I.C. Engines.

To achieve efficient internal combustion under compression, oxygenated air needs to blend with tiny portions of hydrocarbons in the form of liquid or gaseous fuels with a chemical composition of $C_{10}H_{20}$ to $C_{15}H_{28}/CH_4$ to combust efficiently. Atmospheric air is a mixture made up of 78% $N_2$/Nitrogen, 21% $O_2$/Oxygen, 1% Argon with very tiny proportions of carbon dioxide (420 ppm) including traces of neon, helium and hydrogen under one atmospheric pressure at sea level. The oxygen in the air is the primary oxidant to oxidize hydrocarbon fuels to initiate a chemical/thermal reaction resulting in combustion, unleashing extreme heat leading to rapid thermal expansions in the trapped nitrogen. First stages of combustion takes place between hydrogen and oxygen erupting into a blue flame due to spark or surrounding heat, producing some super-heated steam followed by burning of carbon due to the very high surrounding temperatures in the trapped charge with the help of the remaining oxygen supporting combustion to produce $CO_2$/carbon-dioxide as end product with leftovers of partly burned CO/carbon monoxide and unburned hydrocarbons in the form of UHC due to their non-participation in the process of combustion due to improper mix.

I.C. Engines typically need almost 15 times more air by weight from the atmosphere to combust efficiently with fuels made up of hydrocarbons/gasoline/diesel, CNG LPG, Propane etc., resulting in approximately 2.5+Kilograms of $CO_2$ out of one liter of fuel further producing bi-products of about one liter of super-heated steam/$H_2O$ as end products of efficient combustion. Diesel and other heavier less volatile fuels give out more heat, $CO_2$ and soot with less super-heated steam because of their composition of more carbon than hydrogen molecules making it a thicker and heavier fuels requiring immense heat to trigger ignition.

Air breathing I. C. Engines need sufficient oxygen to promote combustion with hydrocarbon fuels surrounded by a larger portion of inert nitrogen from the atmosphere to harness the unleashed energy to derive maximum thermal expansions in the compressed gases. As compression builds up, density in the charge also builds up in a diminishing cylinder with proportionate increases of heat in the trapped charge resulting in separation of $N_2$ the largest commodity with $O_2$ in pockets due to their individual properties further leading to fuel separations by formation of droplets in parts of stagnant pockets in the charge at TDC, when maximum compression is achieved and ignition is triggered. Most often erratic uncontrolled combustion takes place in pockets of sensitive heat trapped areas due to improper mixing, lacking homogeneity in the charge forming into emissions of UHC, CO, soot and $NO_x$ reflecting poor thermal efficiency out of I.C. Engines.

Frequently, in-cylinder combustion is unpredictable due to varying consistency of air/fuel ratios leading to fuel separation into droplets in the final stages of compression due to density increases lacking sufficient oxygen to promote burn and combust properly with scattered fuel particles due to lack of mixing in the compressed charge. Once combustion starts to rapidly spread building up heat, spontaneous ignition occurs in droplets of fuel in the end gases forming into emissions of $NO_x$, CO, soot and UHC. Nitrogen dioxide and oxide of nitrogen are bi-products of very high temperatures in the presence of clustered oxygen combusting erratically with fuel droplets during internal combustion taking place under load in the presence of nitrogen made up of larger molecules.

Normally gases under compression in a concealed cylinder tend to stagnate as the density and temperatures shoots up while the volume reduces to the minimal to form the combustion chamber at TDC lacking any form of swirl or turbulence in the bowl other than gas compression effects which are determined by the gas compression surfaces and the clearances between the two.

Existing combustion chamber greatly fall short by lacking the desired fuel-air mixture motion in controlling excessive temperature build ups resulting in pinging, detonation and spontaneous auto-ignition building up emissions of $NO_x$, $N_2$, CO and soot despite the use of EGR and other techniques, and fail to produce optimum thermal expansions in the trapped nitrogen producing lower thermal efficiencies and power outputs derived out of liquid and gaseous fuels. Moreover, sometime detonation and spontaneous auto-ignition occurs, which results in extreme high temperatures that kill vital microbes in the air which are very essential to all living life on earth causing health related issues in urban environments as seen across the world.

SUMMARY

The present invention provides a piston and combustion chamber including piston crown grooves extending from the combustion bowl, promoting swirl and mix within the compressed gases locked in the bowl into an ideal mix with the introduced fuel forming into an ideal charge trapped in the bowl of the piston crown to overcome erratic, incomplete and improper combustion resulting in lower emissions that can prevent environmental damages due to pollution from UHC, CO, $NO_x$, and soot with the least carbon dioxide formations when using carbon rich fuels such as diesel engine operations under full load.

The bowl is normally located in the centre of the piston crown of most compression ignition engines and other engines having flat cylinder heads with intake/exhaust valve and other recesses to accommodate other parts extending into the combustion chamber volume.

The present invention achieves far lower $NO_2$, NO and other emissions with a smaller carbon foot print with the aid of more complete laminar combustion with better thermal expansions taking place at much lower temperatures inside the cylinder with the help of swirl induced mixing in the piston bowl to further improve I.C. Engine efficiency with improved reliability to help restore our environment with a smaller carbon foot print per Km/Mile out of one single cost effective design change to existing components of present engines requiring no other modifications or major redesigns.

The present Invention also further improves diesel engines converted to run on gaseous fuels such as CNG/Propane/LPG at lowered engine temperatures reducing wear and tear and fragmentation of engine components made out of iron due to higher hydrogen content exposure from gaseous fuels such as $CH_4$/CNG etc, causing burn outs.

This arrangement according to the subject invention of inducing a directional swirl and spin with the desired speed with the help of piston crown grooves or channels or passages in the compressed spinning charge and further directed into the bowl results in controlled laminar combustion using very lean fuel mixtures with greatly reduced emissions of $NO_x$, CO, UHC and soot without the use and need of complex exhaust gas recirculation (EGR) devices. The above features increase the rated output and the efficiency of the engine while keeping the same displacement of the internal combustion engine and allow fuel consumption to be reduced during part-load engine operation to very lean settings with no overheating or improper erratic combustion leading to piston, cylinder head, and valve distortions or damages or burn outs of any sort.

This form of induced spin and swirl improves mixing in the compressing charge and spread of inert nitrogen made up of larger molecules out of the placement of grooves or channels or passages to achieve a dynamic mix in the charge before ignition followed by controlled combustion resulting in smoother, quieter and cooler combustion in naturally aspirated spark ignition and compression ignition engines further boosting torque and power outputs over a wider operating power band with leaner air/fuel mixtures are also possible. Further force feeding of air with the help of turbochargers and superchargers is possible with no negative or ill effects of overheating to harness the developed boost in power further improving reliability and drive-ability with the widest range ever possible reducing the number of gearbox speeds to the minimum to achieve a better power to weight ratio from compact power trains delivering the smallest carbon foot print with the lowest raw emissions exiting the exhaust port.

Diesel engines converted into spark ignition engines perform better with the placement of grooves or channels or passages on the piston crown according to the present invention featuring a bowl to help mix gaseous fuels like CNG/LPG/Propane etc., better with the compressed air largely made up of inert nitrogen to spread out more evenly with the available oxygen to achieve optimum efficiency due to better expansions in the hot inert nitrogen and carbon dioxide gases with the available super-heated steam aiding the process of greater expansions on the power stroke with no overheating or reliability issues as seen in present gasified engines.

By the process of placement of grooves or channels or passages on the rim of the piston crown pointing into the bowl at an angle in our new filing—promotes the much need swirl in the bowl due to the rapid acceleration of the piston from mid stroke onwards to the closing stages of the compression stroke to achieve a dynamic state of spin with an inbuilt inertia at TDC to promote the spread and mix of the injected fuel with the compressed spinning air in the bowl in shortest time frame promoting better self-ignition in a larger area of the bowl before piston movements starts to expand the combustion chamber/cylinder on the power stroke.

This invention achieves a better and even spread of nitrogen the largest inert constituent present in the charge with the available oxygen molecules to form into a dynamic state of spin within the compressing charge to attain accelerated laminar total clean burn combustion (A.L.T.C.B.C), deriving maximum thermal expansions in the exhumed hot exhaust gases to act upon the piston to produce optimum torque and power with little waste heat or absorption into engine components with the lowest of raw emissions achieving a smaller carbon foot print per ton/per Km of hauling work with better performance with the least heat dissipation and emissions into the atmosphere protecting our environment from global warming and climate change resulting in colossal damages across the world. Nitrogen plays a vital role in nature and is the largest constituent making up atmospheric air. The spread and mix of nitrogen out of induced swirl with the rest of the ingredients promotes laminar combustion in air breathing engines to achieve optimum thermal expansions in the hot gases. Nitrogen being the largest inert constituent making up the charge plays a vital role in the expansion process to generate power. Without the presence of nitrogen, very little expansions would take place in the hot gases leading to oxidization and burnouts of engine components causing self-destruction.

This design is applicable to any piston featuring a bowl embedded in the piston crown.

BRIEF DESCRIPTION OF THE DRAWING

These and further features according to the present invention will be better understood by reading the Detailed Description taken together with the Drawing figures, wherein.

DETAILED DESCRIPTION

Figure 1:
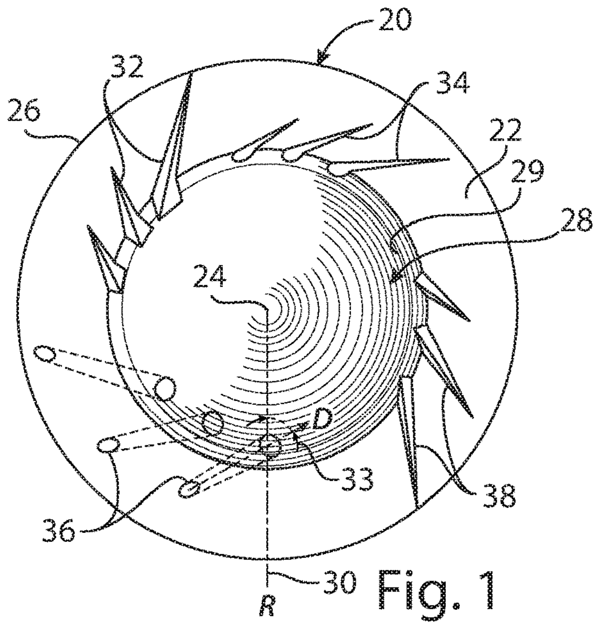
FIG. 1 is a plan view of the piston crown according to one embodiment of the present invention.

In and part of the top surface 22 of a piston 20 crown shown in FIG. 1 are three different representative forms of grooves 32, 34 and passages 36 that extend generally radially outward from the piston bowl 28 center 24 toward, and in some embodiments, to the outer periphery 26 of the piston crown. The grooves 32, 34 and passages 36 typically have an inner end at the wall 29 of a combustion bowl 28 formed as a recessed area extending from and away from the piston top surface 22. Moreover, the grooves 32, 34 and passages may be curved or straight, and may have a direction D offset from a radial line R, 30 by an angle 33 wherein the direction is between the bowl center 24 and the bowl wall 29 to encourage the formation of a swirl motion (60, FIG. 3) of combustion mixture therein. The grooves 32, 34, 36 are shown together in a single, exemplary embodiment to illustrate that more than one type of grooves and/or passages can be provided in an embodiment; however, embodiments having a single style of groove or passage, including those not shown but formed according to the present invention, are included in the present invention.

The grooves or channels or passages or a combination of all the three occupy a volume not more than 5 to 20% of the volume concealed in the bowl with a shallow sloping angle of 3 to 20 degrees tapering into the bowl at an angle in relation to the center of the bowl to generate a desired induced swirl to achieve a dynamic state of spin in the compressing charge with the injected fuel to promote mixing of the charge trapped in the bowl dependent on the charge density governed by the surrounding temperatures when maximum compression is achieved out of optimum cylinder filling to promote laminar combustion that yields maximum thermal efficiency out of the fuel in use.

According to the present invention, these grooves or channels or passages due to their locations cause a greater vacuum buildup in the bowl 5, out of the negative swirl created due to the high vacuum build-ups on the intake stroke out of piston acceleration towards BDC further aiding complete forceful filling of the bowl 5, on the compression stroke starting from mid stroke onwards TDC due to the rapid piston acceleration after closing of the intake valve achieving the desired swirl in the bowl promoting the best possible homogeneous mixture in a state of spin in the compressed air & fuel mixture trapped in the bowl with little ignition delay in compression ignition engines leading to laminar combustion with little formation of $NO_x$ and soot due to total participation of fuel with the available oxygen achieving maximum thermal expansions in the trapped inert nitrogen For the purposes of this disclosure, the following definitions are used:

TDC: Top Dead Center—a location on a piston distal from the crankshaft and the end of the piston compression stroke.

BDC: Bottom Dead Center—Is the opposite when the piston is closest to the crankshaft during the end of the power or intake stroke.

squish: Is the effect of forcing out some of the trapped mixture between two mirroring surfaces forming the combustion chamber in close proximity of the cylinder head and piston crown at TDC.

swirl: a dynamic state of spin for a volume of mixture in a clockwise or counter clockwise direction.

crown: a portion of a piston facing the combustion mixture and extending a distance into the piston sufficient to support or include the grooves and passages of the present invention. Typically the crown includes at least a portion of a combustion bowl and some surfaces which mirror portions of the cylinder head.

turbulence: a fluid motion being non-directional and/or chaotic in direction.

CNG: Compressed natural gas stored at high pressure.

LPG: Liquefied Petroleum Gas stored at lower pressures.

I.C. Engines: Internal Combustion engines

UHC: Unburned hydro carbons due to their non-participation in the process of combustion due to improper mix or lack of Oxygen.

concealed cylinder: once the Inlet and Exhaust Valves or ports close on the compression stroke, the drawn in mixture is 'concealed' inside the cylinder, leaving nowhere to escape but to get compressed.

Figure 2:
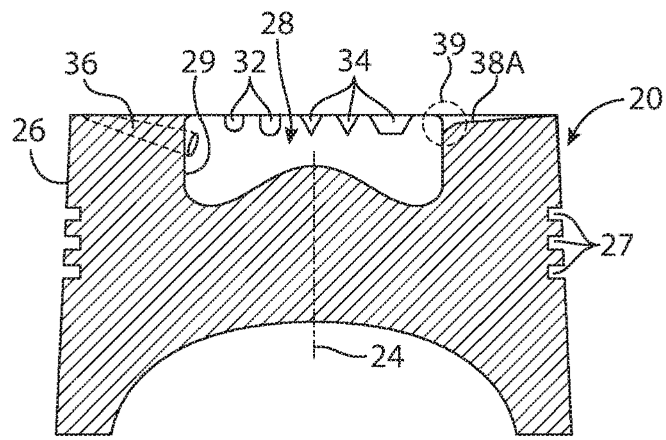
FIG. 2 is an elevational cross-section of a piston according to an alternate embodiment of the present invention.

A cross-section view is shown in FIG. 2, wherein the piston 20 includes peripheral grooves 27 for piston rings (not shown) that engage the wall (55, FIG. 3) of the cylinder (52) and the combustion bowl 28 is circular and has a center 24 coincides with the center of the piston 20, but other embodiments (not shown) may comprises a piston having a combustion bowl of another shape, including an asymmetrical shape, and have a center offset from the piston center. As shown in FIG. 2, the grooves 32, 34, 38 and passage 36 extend from the wall 29 of the combustion bowl and diminish in cross-section area moving outward toward the piston periphery 26. In the exemplary embodiment of FIGS. 1 and 2, the grooves 32, 34, 38 and passage 36 typically diminish at a constant rate moving outward from the combustion bowl 28. However, the present invention includes different rates of change as illustrated by the more rapid rate of diminution of beginning of groove 29 from the remainder of the groove 38A (and may be applied to the other groove or passage embodiments), and may include non-constant rate of change of groove or passage cross-section. Also noted, the embodiments may include various shapes and kinds of tapered passages or grooves, or a single kind (e.g. one of groove 32, 34, 38 or channel 36).

Figure 3:
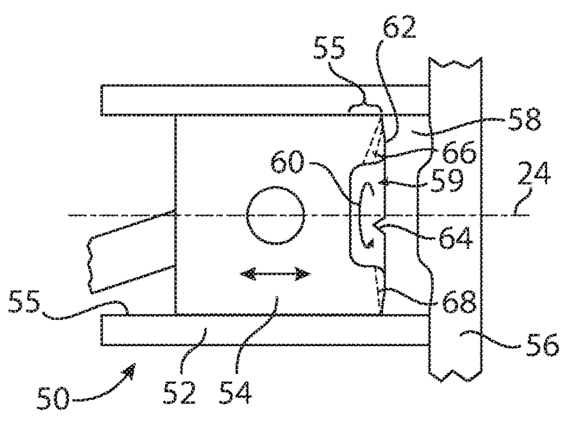
FIG. 3 is a cross-section of a combustion chamber including a cylinder, cylinder head and piston according to a further embodiment of the present invention.

A simplified cross-section of a combustion engine cylinder 50 is shown in FIG. 3, which includes a piston generally similar to piston 20 of FIGS. 1 and 2, and further comprises a cylinder wall 52 retaining the piston 54 therein (piston rings, inlet and outlet valves, igniter and securing devices omitted for clarity) and a cylinder head 56 portion engaging the end of the cylinder wall which together with the piston 54 form a combustion area 58 which is compressed by motion of the piston 54 toward the cylinder head 56 after a combustion mixture (e.g. fuel, oxidant, etc.) are introduced. The piston 54 of the embodiment 50 of FIG. 3 includes a crown 55 including the surface 62 facing, and in portions mirroring the contours of the surface 57 of the cylinder head 56. Also shown are representative grooves 64, 68 and passage 66 generally similar to the grooves according to the present invention previously discussed. As discussed with regard to the embodiments of FIGS. 1 and 2, the grooves 64, 68 and channel 66 are directed to be offset in direction from the bowl 59 center 24A to induce a swirling motion 60 onto the combustion mixture there in and entering via the crown passage(s) and/or grooves, before ignition takes place near TDC followed by subsequent combustion engulfing the charge typically consisting of largely made up of 78% nitrogen which is an inert gas with approximately 20% oxygen which is the oxidant with a smaller portion of hydrocarbon fuels introduced later nearing TDC in the bowl with the induced swirl having an inertia to retain the dynamic motion in the gases to mix more complete with the injected fuel droplets to achieve laminar total combustion in the shortest time frame with the least emissions.

The mixture swirling motion 60 may be produced under compression (piston 54 moving toward cylinder head 56 before combustion) or expansion (piston 54 moving away from cylinder head 56 after combustion). Ideal placement of grooves or channels or passages work both ways in an compressing cylinder; they direct the compressing air into the bowl with an intentional spin avoiding separation in the largest inert constituent nitrogen made up of larger molecules with vital oxygen further allowing the injected fuel to spread better in the shortest time frame and atomize ideally due to the spinning compressed dense air to combust evenly and spread the flame fronts to reach the far ends of the now expanding combustion chamber delivering a very effective power stroke out of better expansions with improved thermal efficiency with the least emissions with little waste heat left in the fully expanded exiting hot exhaust gases deriving a smaller carbon foot print from liquid and gaseous fuel in spark and compression ignition I.C. Engines.

The grooves 32, 38, 64, 68 may comprise "V" shaped cross-section shapes, and the grooves 34 may comprise "U" shaped cross-section shapes, and the passages 36 (extending through portions of the piston crown with openings at the ends) may comprise circular or oval shaped cross-sections, and are typically monotonically diminishing moving away from the corresponding bowls. Alternate embodiments of the present invention may include other cross-section shapes that produce the desired swirl and spin according to the present invention. Grooves, channels 34, 38, or passages 36 radiate out from the bowl 28, to the ends of the combustion chamber through the squish areas or flat surfaces 22. These grooves or passages are angled into the bowl 28 to generate the desired swirl and have a depth and diameter proportional to the circumference of the combustion chamber in relation to the available squish area on the piston crown determined by the bowls diameter and its volume in the piston. These grooves or channels or passages start from the extreme ends of the combustion chamber and taper out to a point closest to the bowl 28 at an angle best suited for the desired swirl from any piston design featuring a bowl forming the combustion chamber.

The sloping nature of the grooves or channels 34, 28, or passages 36, located through the flat area 22 of the piston crown (55) into the centrally located bowl 28, further improves piston bowl filling with the desired directional swirl and spin greatly improving fuel dispensing and mixing taking place in a shorter time frame between direct injection and pulverization of the fuel into a spinning homogenous charge with an inbuilt inertia in compression ignition and spark ignition I.C. Engines to achieve quicker ignition with subsequent wholesome combustion preventing pockets of explosions that give rise to oxides of nitrogen and other forms of pollutants forming into particulate matter in the form of soot. This unique design concept is applicable to all forms of compression ignition two and four cycle piston designs of I.C. Engines irrespective to the fuel in use. In principle, the desired directional swirl in the bowl 28, causes a better mix in all the ingredients present due to the ongoing swirl in the air/fuel mixture during compression followed by combustion resulting in a quick and efficient combustion cycle compared to existing designs encountering stagnation in the charge locked in the bowl nearing TDC when peak pressures are reached.

Figure 4:
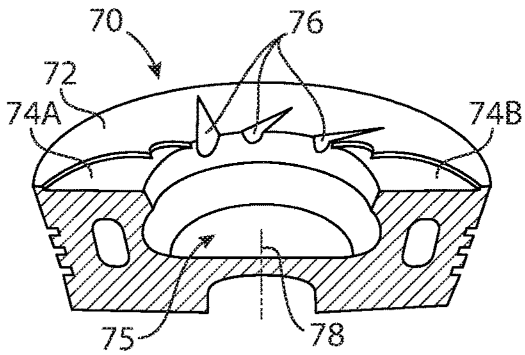
FIG. 4 is a perspective view of a piston cross-section according to a further alternate embodiment of the present invention.

A cross-section of a piston 70 of a further embodiment is shown in FIG. 4, wherein the piston 70 top surface 72 includes generally planar recesses 74A, 74B to accommodate valve heads when the piston is at TDC, and a substantially centered (within piston surface 72) combustion bowl 75. Extending radially outward from the bowl 75 between the recesses 74A, 74B are three generally "U" shaped recesses generally radially outward extending from the bowl but with a direction offset from the bowl center 78.

Figure 5:
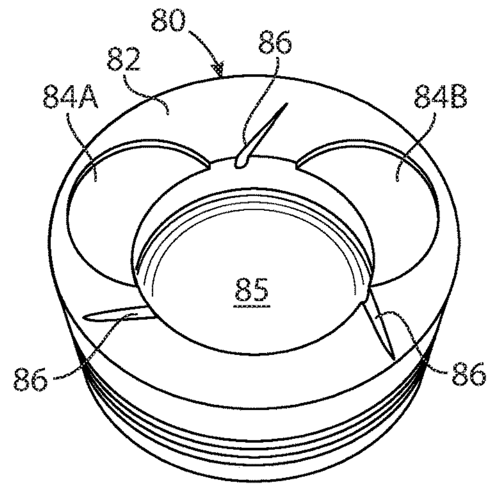
FIG. 5 is a perspective view of the piston according to a further embodiment.

A piston 80 generally similar to piston 70, is shown in perspective view in FIG. 5, wherein piston top surface 82 includes valve head recesses 84A, 84B but with fewer (one above, two below) grooves on the surface 82 between valve head recesses 84A, 84B and generally uniformly spaced around combustion bowl 85.

Figure 6:
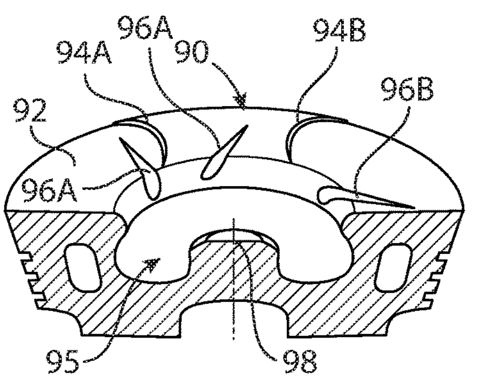
FIG. 6 is a perspective view of a piston cross-section according to a further alternate embodiment of the present invention.

A further embodiment is shown in the cross-section perspective view of piston 90 in FIG. 6, wherein the piston surface 92 includes valve head recesses 94A, 94B thereon as well as grooves 96A, 96B according to the present invention which induce mixture swirl in bowl 93. The grooves 96A are more closely spaced and more widely space relative to groove 96B. Bowl 95 includes a raised central areal 98.

Figure 7:
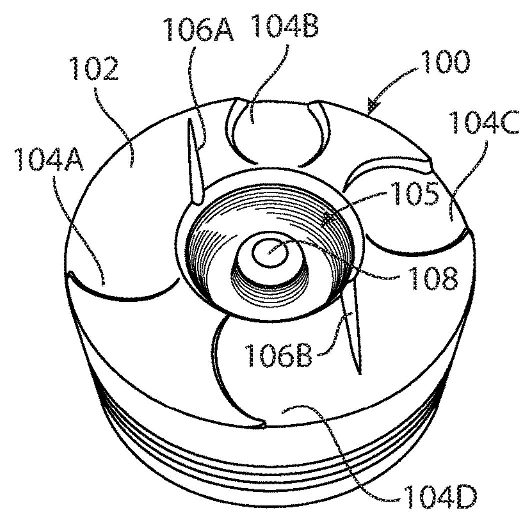
FIG. 7 is a perspective view of the piston according to a further embodiment.

The alternate embodiment of FIG. 7 shows an entire piston 100 head surface 102 having valve head recesses 104A, 104B, 104C, 104D generally surrounding the combustion bowl 105. This embodiment has two radially extending grooves 106A, 106B offset to the center to create a positive swirl with the least interference occupying the least volume according to the present invention disposed on the piston surface 102 between valve head recesses 104A, 104B and 104C, 104D, respectively to promote.

Thus, according to the present invention, improved swirl and filling of the air/fuel charge into the bowl 28 is achieved, promoting positive ignition in a larger area with greatly improved flame propagation in the bowl of two and four cycle compression ignition engines further improving engine efficiency over existing designs. Furthermore, after ignition occurs, the flame fronts engulfs the charge by simultaneously burning through the compressed charge in the bowl more efficiently in a shorter duration at earlier crank angles and forcefully exit the piston bowl 28, due to the steep pressure rises out of wholesome combustion through the grooves or channels or passages to reach the far ends of the combustion chamber in the shortest possible time causing the spread of flame fronts while the main flame front burns through the bulk of the spinning charge in the central bowl 28, further aiding to connect the fast descending piston to deliver a more efficient power stroke from the rapidly expanding exhumed gases that lose their expansions by the time the piston reaches BDC delivering optimum thermal efficiencies in the form of work stored in the flywheel.

In some embodiments, just 2 opposing offset or 3 equidistant grooves or channels or passages placed at an angle on the squish surface of the piston crown are sufficient to initiate the desired swirl into the bowl The present invention brings about an even mix in the largest inert constituent nitrogen to stay in a state of dynamic mix during high pressure direct injection of fuel is timed and aimed into the bowl to mix efficiently with the available spinning oxygen to promote self-ignition in an larger area and the spread of flame fronts derived out of multi holed fuel injection into the rest of the spinning compressed air having an inertia due to the induced swirl in the bowl, further promoting flame spread which in turn intermingles with the remaining oxygen to result in wholesome efficient laminar combustion producing superlative thermal expansions in the shortest time frame with no residue of unburned fuel. Such form of mixing in all the ingredients result in optimum thermal expansions in the hot gases and other advantages are provided by this unique physical layouts of the grooves or channels or passages in combustion chamber housing a bowl large enough to accommodate the major portion of the charge according to the present invention, as shown in the above discussed embodiments and drawing figures.

In the case of diesel engines converted to CNG or other flammable gases running on spark ignition with lower compression ratios for convenience lack proper mixing in the charge will greatly benefit and improve with the desired induced swirl and spin out of grooves 34, channels 38 and passages 36, alone or in combination, displayed on piston crowns featuring a bowl 28, resulting in ideal mixture formations largely made up of heavier inert nitrogen molecules to blend better with the lighter hydrogen rich $CH_4$ gaseous fuels with a larger volume to blend with oxygen to derive more complete combustion to achieve optimum thermal expansions in the hot gases preventing over heating as seen on standard gasified engines due to slow burning characteristics lacking proper mixing of CNG in the bowl due to compression.

Additionally, the embodiments of the present invention include adjacent and/or contiguous grooves, such as two contiguous grooves which form a "W" shape (or further contiguous and/or adjacent grooves) next to each other, conveying more volume through the squish without a groove going deeper into the piston that would weakening the crown due to a deeper V Channel. Further modifications and substitutions of the above-described invention by one of ordinary skill in the art are within the scope of the present invention, which is not to be limited, except by the claims which follow.

What is claimed is:

1. A combustion chamber of an internal combustion engine, comprising:

a combustion cavity having an end surface and receiving a combustion mixture therein;

a piston movable into said combustion cavity toward said end surface, said piston including a combustion surface facing said combustion chamber end surface having a bowl recess in said combustion surface, and including shallow fluid passages disposed in said combustion surface and connected to said bowl recess, to induce a swirl motion of said combustion mixture in response to compressing motion of said combustion surface toward said combustion cavity end surface, wherein said shallow fluid passages occupy a volume not more than 5 to 20% of said the volume concealed in said cavity with a sloping angle of 3 to 20 degrees tapering into said bowl recess at an angle in relation to the center of the cavity.

2. The combustion chamber of claim 1, wherein said shallow fluid passages comprise straight fluid passages.

3. The combustion chamber of claim 1, wherein said combustion surface includes a center, and said fluid shallow are crescent shaped having a concave side disposed facing said combustion chamber center.

4. The combustion chamber of claim 1, wherein said shallow fluid passages comprise at least one type of groove, channel and passage.

5. The combustion chamber of claim 1, wherein said piston comprises a periphery having a diameter, and said shallow fluid passages each comprises fluid passages having a small opening through a solid portion of said piston, disposed proximal said periphery and extend inwardly from said periphery becoming progressively larger.

6. The combustion chamber of claim 1, wherein said piston bowl recess including a bottom surface distal from said combustion surface having a portion raised toward said combustion surface, said bowl recess being disposed to receive said swirl motion of said combustion mixture.

7. The combustion chamber of claim 1, wherein said shallow fluid passages are disposed to accommodate mixture of air with one of CNG, Propane, and LPG.

8. The combustion chamber of claim 1, wherein said shallow fluid passages diminish in a non-constant rate of diminution extending from said cavity.

9. A piston for use in an internal combustion engine, comprising:

a piston body movable into a combustion cavity along a direction, said piston including a crown surface facing said direction having a recessed combustion region having a volume, and including shallow fluid passages connected to said recessed combustion region to induce a swirl motion of said combustion mixture in response to motion of said piston along said direction, wherein said fluid passages occupy a volume not more than 5 to 20% of said the volume concealed in said cavity with a sloping angle of 3 to 20 degrees tapering into said cavity at an angle.

10. The piston of claim 9, wherein said shallow fluid passages comprise straight fluid passages.

11. The piston of claim 9, wherein said crown includes a center, and said shallow fluid passages are crescent shaped having a concave side disposed facing said crown center.

12. The piston of claim 9, wherein said shallow fluid passages diminish at a non-constant rate of cross-section diminution extending from said recessed combustion region.

13. The piston of claim 9, wherein said piston body comprises a periphery having a diameter, and said shallow fluid passages each comprises fluid passages having a small opening through a solid portion of said piston disposed proximal said periphery and extend inwardly from said periphery becoming progressively larger.

14. The piston of claim 9, wherein said shallow fluid passages are disposed to accommodate mixture of air with one fuel type of liquid fuel, CNG, Propane, and LPG.

15. The piston of claim 9, wherein said shallow fluid passages comprise shallow fluid passages disposed at variable spacing around said recessed combustion region including a bottom surface distal from said crown surface having a portion raised toward said crown surface facing, said bowl recess being of said piston, said variable spacing shallow fluid passages includes contiguous shallow fluid passages.

16. A method of providing combustion in a chamber of an internal combustion engine, comprising:

providing a combustion cavity having an end surface and receiving a combustion mixture therein;

providing a piston movable into said combustion cavity toward said end surface, said piston including a combustion surface facing said combustion chamber end surface and including a recessed bowl having a volume; and providing shallow fluid passages in said piston which occupy a volume not more than 5 to 20% of said the volume of said bowl with a sloping angle of 3 to 20 degrees tapering into said bowl at an angle disposed to induce a swirl motion of said combustion mixture in response to piston motion of said combustion surface relative to said combustion cavity end surface.

17. The method of claim 16, wherein said providing shallow fluid passages comprise providing straight fluid passages.

18. The method of claim 16, wherein said providing shallow fluid passages comprise providing fluid passages disposed at different spacing around said recessed combustion region including one of the type comprising a groove, a channel and a passage.

19. The method of claim 16, wherein providing said piston comprises providing a piston periphery having a diameter, and providing said shallow fluid passages each comprises providing fluid passages having a small opening through a solid portion of said piston disposed proximal said periphery and extending inwardly from said piston periphery becoming progressively larger.

20. The piston of claim 16, wherein said providing shallow fluid passages comprises providing contiguous shallow fluid passages.

* * * * *